United States Patent [19]

Gerber et al.

[11] Patent Number: 5,885,086
[45] Date of Patent: Mar. 23, 1999

[54] INTERACTIVE VIDEO DELIVERY SYSTEM

[75] Inventors: Merrill Gerber, Preston; Cameron Johnson, Mystic, both of Conn.

[73] Assignee: The United States of America as represented by the Secretary of the Navy, Washington, D.C.

[21] Appl. No.: 581,824

[22] Filed: Sep. 12, 1990

[51] Int. Cl.$^6$ .............................. G09B 5/00; G09B 9/00
[52] U.S. Cl. ........................................ 434/307 R; 434/2
[58] Field of Search .................... 434/2, 6, 25, 220, 434/307, 307 R

[56] References Cited

U.S. PATENT DOCUMENTS

| | | | |
|---|---|---|---|
| 2,545,191 | 3/1951 | Brettell, Jr. et al. | 434/6 |
| 2,969,599 | 1/1961 | Nye et al. | 434/6 |
| 4,973,252 | 11/1990 | Krueger | 434/6 |

*Primary Examiner*—Charles T. Jordan
*Assistant Examiner*—Theresa M. Wesson
*Attorney, Agent, or Firm*—Michael J. McGowan; Prithvi C. Lall; Michael F. Oglo

[57] ABSTRACT

An interactive video delivery system (IVDS) is used in conjunction with software for training purposes. The IVDS emulates a tactical display system sonar console by using software to provide its input information. The tactical display system sonar console uses actual sonar signals detected by sonar array systems. The IVDS training aid comprises an emulated AN/UYQ-21 console having a computer and an interactive videodisc system. The computer provides the necessary graphics processing for emulation of the tactical displays.

5 Claims, 4 Drawing Sheets

INTERACTIVE VIDEO DELIVERY SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to training aids. More particularly the system provides a cost effective means to learn the operational skills of a militarized tactical display system in a "hands-on" environment without incurring the cost of the militarized tactical display system.

2. Description of the Prior Art

At the present time students are taught operational skills including theory, knobology, and procedures in a classroom environment. Then each student, individually or in pairs, is taken into a lab and shares time on a militarized tactical display system. Meanwhile, other students in the class either read or most likely simply wait until their turn on the tactical system. The time waiting is considered unstructured time and is often a large portion of a course. When a student is called into the lab for his limited time on the tactical system he has had no previous opportunity to practice the skills taught in the classroom. Therefore, much of the laboratory time is spent reviewing classroom material rather than introducing new material.

An alternate to the use of tactical systems is the use of commercial grade emulators. The widespread use of emulators is restricted by the fact that commercial display emulators must be connected to commercial processing emulators, which in turn must be supported by special purpose software emulators of the sensors. The total system is quite expensive although often less expensive than tactical systems.

SUMMARY OF THE INVENTION

Accordingly, it is a general purpose and object of the present invention to provide an improved training aid. It is a further object to provide a training aid that will reduce the length of a course and at the same time improve the skills learned by the student. Other objects are that the training aid will simulate the performance of a tactical system as closely as possible and will improve performance on the tactical system by the student.

These objects and others are accomplished with the present invention by providing an interactive video delivery system training aid. The training aid provides a cost effective means for operators, sonar supervisors, and antisubmarine warfare (ASW) evaluators to learn operational skills in a hands-on environment that is applicable to a militarized tactical display system. The training aid, at a greatly reduced cost, takes the place of the militarized tactical display system in the training environment.

DESCRIPTION OF THE PREFERRED EMBODIMENT

The present invention relates to a training aid. All components described are state-of-the-art devices capable of being assembled by those of skill in the art.

Figure 1:
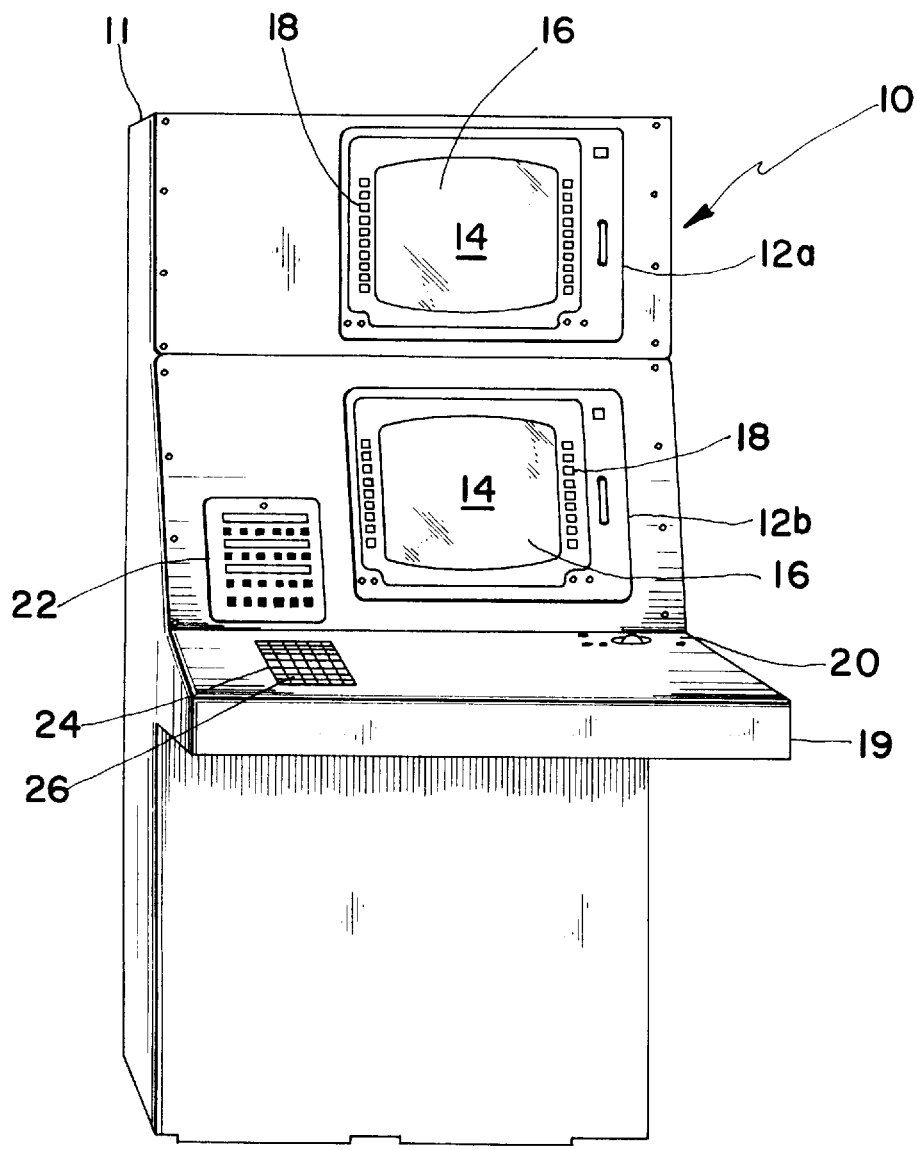
FIG. 1 is a perspective view of an interactive video delivery system in accordance with the present invention.

Referring now to FIG. 1 there is shown an interactive delivery system console 10. The console 10 has a cabinet 11 holding two identical basic display unit (BDU) assemblies 12a and 12b. Each BDU assembly 12a and 12b includes one high-resolution color monitor 14, a surface acoustic wave (SAW) touchscreen 16, and variable function keys (VFKs) 18. The cabinet 11 is shaped to have a bullnose (desktop) 19. In addition, the console 10 includes a track ball unit with four special function pushbuttons 20, a computer controlled action entry panel (CCAEP) 22, and an acoustic control module (ACM) 24 having a 6×7 switch array 26. Additional components comprising part of console 10 not shown in FIG. 1 are a headset jack 28 for an operator headset 29 and an integrated processor/video disc system 30 that is mounted internally to the console cabinet 11. These components 28, 29 and 30 are shown in the block diagram of FIG. 2.

Figure 2:
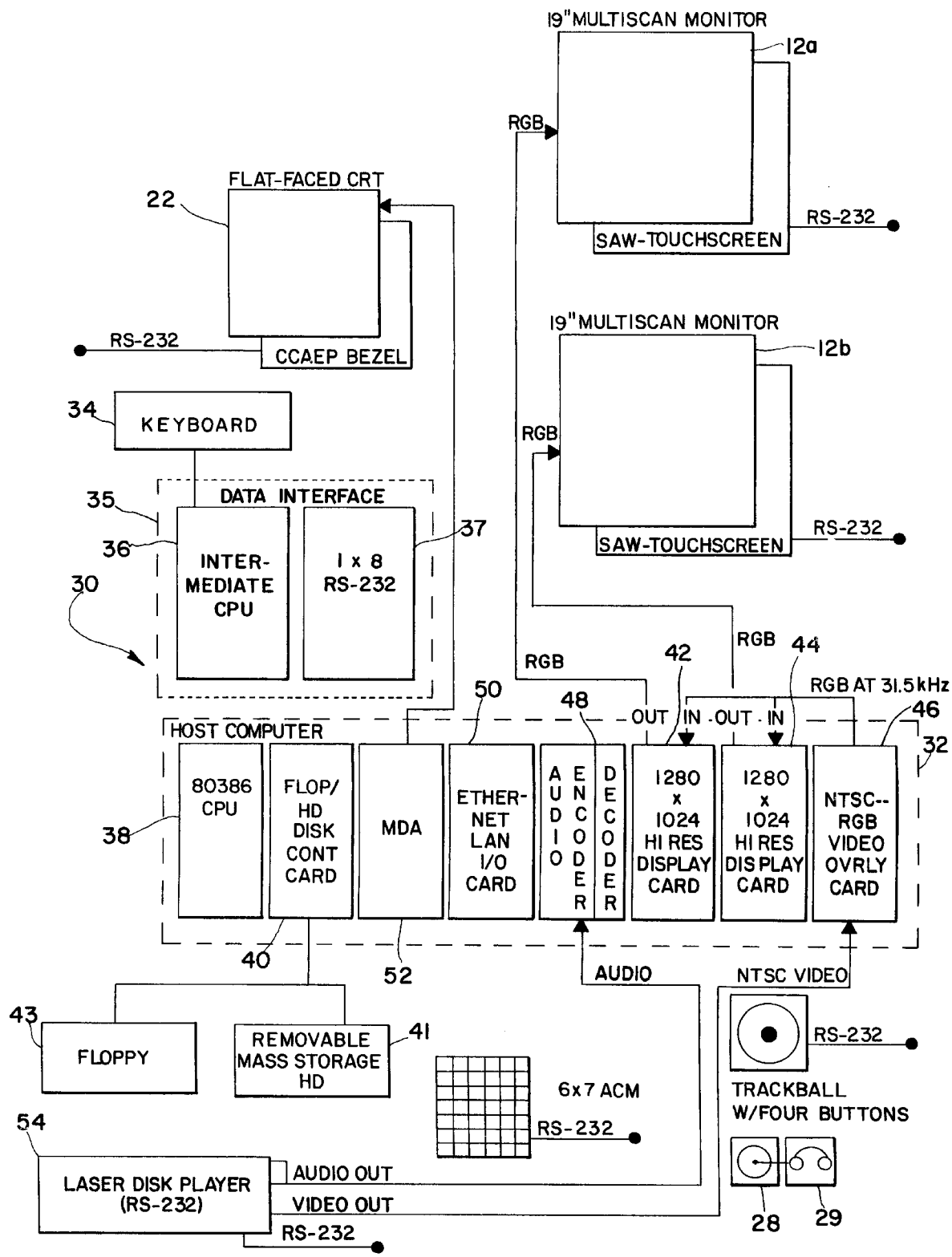
FIG. 2 is a block diagram of the interactive video delivery system in accordance with the present invention.

Refer now to FIG. 2 where there is shown a block diagram of the components of the interactive delivery system (IDS) console 10 of FIG. 1. The block diagram includes in addition to various components shown in FIG. 1, the above mentioned additional components that are not shown in FIG. 1.

The integrated processor/video disc system 30 is mounted internally to the console cabinet 11 of FIG. 1. The system 30 performs the function of system control, I/O control, data transfer, video disc control, screen display generation and update, and student performance monitoring.

The system 30 comprises a computer 32 with a keyboard 34, data interface 35, and laser disk player 54. The keyboard is normally placed on the bullnose 19 shown in FIG. 1. The computer 32 has an 80386 host processor 38, floppy hard disk controller card 40, two high resolution professional graphics boards 42 and 44, a video graphics card 46, an audio encoder/decoder 48, a networking card 50 and an MDA card 52. The data interface 35 has a 12 MHz intermediate CPU 36 and a 1×8 RS232/RS422 37.

The 80386 host processor 38 is capable of multiple clock speeds with a 16 MHz clock. The processor 38 has a software switchable clock speed, 4 MB of RAM on CPU board, an AT Buss compatibility and functionality (MS-DOS), an 80387 co-processor, and is capable of booting without a keyboard.

The controller card 40 is connected to a removable 100 megabyte storage drive 41 with an average access time of 28 msec and a 3.5"1.44 megabyte floppy disk drive 43.

The two high-resolution professional graphics boards 42 and 44 have a color display, 1280×1024 pixel resolution, a T1-34010/20 graphics processor, 1.5 MB of graphics memory, an RGB input (non-interlaced), a horizontal scan rate between 31.5 kHz and 64 kHz switchable via software control, an address/interrupt selectable for multiple board operation, a programming tool kit to provide autocad drawing display utility to capture autocad file as a TI-34010 display list, a direct load utility to allow loading of multiple display lists to the TI-34010 and route display lists to two or more display cards. Graphic boards 42 and 44 are connected to respective color monitors 12a and 12b.

The video graphics card 46 is VGA compatible with an overlay on video. The card 46 has graphics overlay capability, NTSC video input, and RGB output at 31.5 kHz horizontal scan rate (non-interlaced). In addition, a software applications development kit provides C libraries for system control, utility programs for picture file loaders and converters, and utility programs (drivers) for superimposers.

The audio encoder/decoder 48 is a HI/FI encoder/decoder. It has ADPCM encoding, 16K sampling rate, 20 Hz–7 kHz frequency response, 48 dB signal-to-noise ratio, software selectable sampling rate, digital audio record/playback, digital display and edit of audio files. It passes incoming audio through to host processor 38.

The networking card 50 is an Ethernet card with 10 MHz clock speed.

The MDA card 52 completes the computer 32 block diagrams in FIG. 2 and it supplies a monochrome signal to the CCAEP 22.

The laser disk player 54, shown in FIG. 2, forms part of the system 30. It is a 12" optical disk player with its input having an RS-232C connection. The player 54 supplies an RCA standard audio output to the audio encoder/decoder 48 and an NTSC video output to the video graphics card 46. The player 64 has play, seek, fast forward, reverse control via software selection, disk player status feedback, and software driver utilities for disk player control (in 'C' language).

Also shown in FIG. 2 are the previously mentioned headset jack 28 and headset 29. The headset jack 28 is located under the bullnose 19 of FIG. 1.

Figure 3:
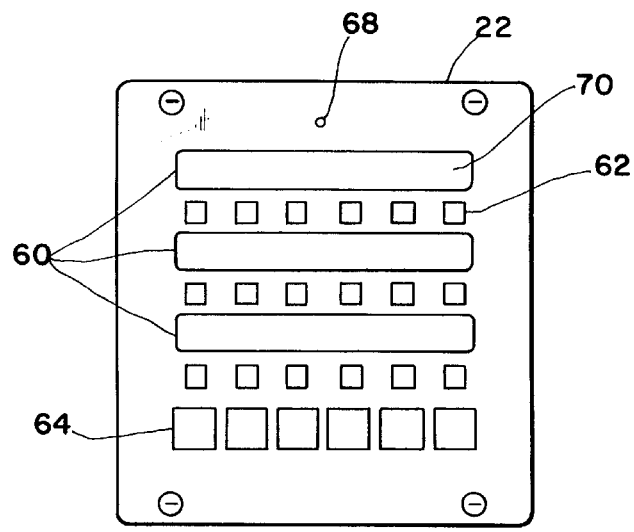
FIG. 3 is a view of the computer-controlled action entry panel of FIGS. 1 and 2.

Refer now to FIGS. 1, 2, and 3 for a description of the CCAEP 22. The CCAEP 22 comprises flat faced cathode ray tube (CRT) device 60, a set of 18 variable action buttons (VABs) 62, and a set of six fixed action buttons (FABs) 64. The label associated with each VAB 62 is displayed above the switch 62 on the flat-faced CRT device 60. A feedback indicator lamp 68 in the CCAEP assembly 22 is used for computer acknowledgment of button 62 depressions.

The flat-faced CRT device 60 displays all of the unique legends under software control. The VAB legends are aligned with the appropriate VABs 62. There is visual separation of the legends on a row. The VAB's 62 are dynamic function switches under software control located in the top three rows of the panel 22. The FABs 64 are located in the bottom row of the panel 22. The legends for the FABs 64 are located in the switches themselves.

Figure 4:
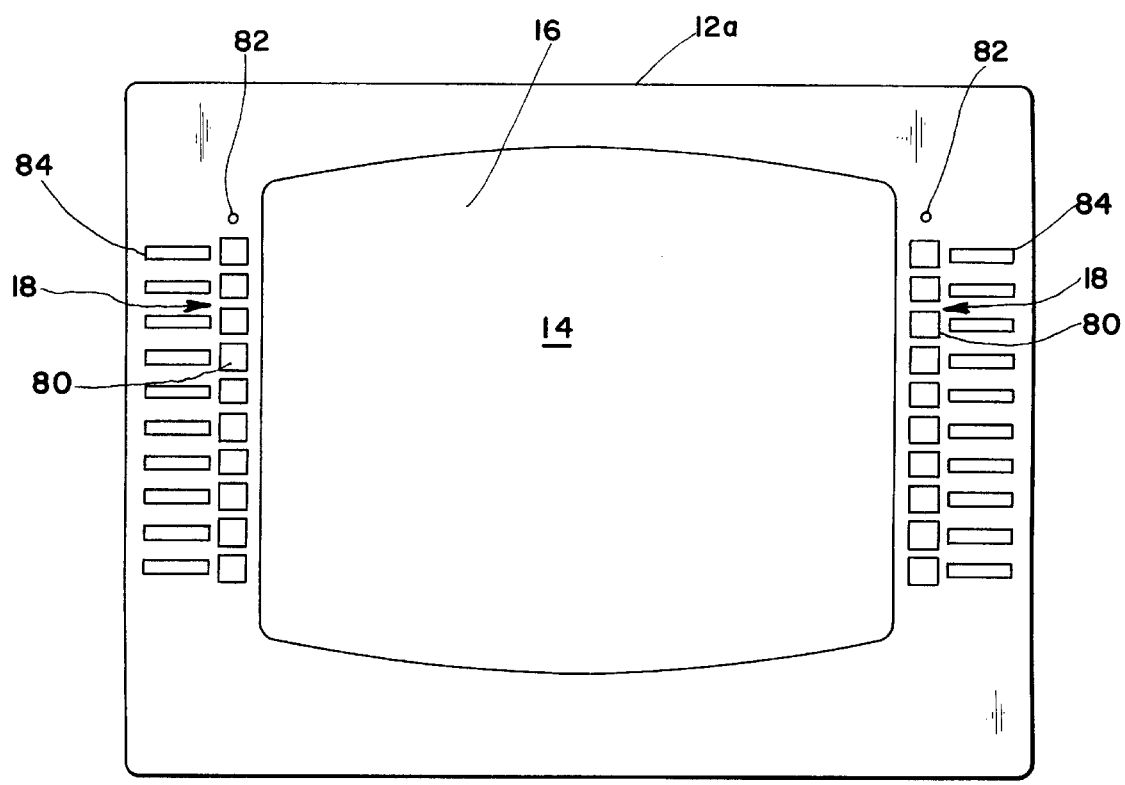
FIG. 4 is a view of the layout of one of the basic display units of FIGS. 1 and 2.

Refer now to FIGS. 1, 2 and 4 for a description of the two BDU assemblies 12a and 12b. FIG. 4 shows only one BDU 12a. However BDU 12b is identical. As mentioned previously each BDU assembly 12 comprises one high-resolution color monitor 14, an SAW touchscreen 16, and variable function keys 18.

Each high-resolution color monitor 14 comprises one 20"/19"V color, non-interlaced, auto scan monitor. Each monitor 14 has 1280×1024 pixel resolution, 30–64 kHz auto switching horizontal scan rate, horizontal frequency lock-on within one seconds (max), 90° in-line gun, 0.31 mm dot pitch, RGB input to match output of graphic cards 42 and 44, and short persistence phosphor.

SAW touchscreens 16 were selected due to their transparent features and the optical third coordinate or Z-axis in addition to the conventional X-Y position coordinates. Each SAW touchscreen 16 is compatible with the autoscan monitor. It has 1200–1900 baud ASCII data rate, 90% transmissivity, 16 levels of Z-axis, EMI-Class A, device drivers compatible with MS-DOS, and address/interrupt selectable for multiple touch input/operation. Each SAW touchscreen 16 has an RS-232C serial input connection.

The variable function keys 18 of the BDU's 12a and 12b are comprised of two sets of ten switches 80, one set centered vertically along each side of the BDUs 12a and 12b. On top of each set of VFKs 18 is a feedback indicator lamp 82 that is used for computer acknowledgement of VFK 18 depressions. Both feedback indicator lamps 82 are lit and then extinguished when one of the VFKs 18 is actuated. The indicator lamp 82 stays on for approximately 0.25–0.5 seconds. The VFK labels 84 vary with the operational mode and the software being used by the host computer 32. The VFKs 18 are dynamic function switches under software control.

Figure 5:
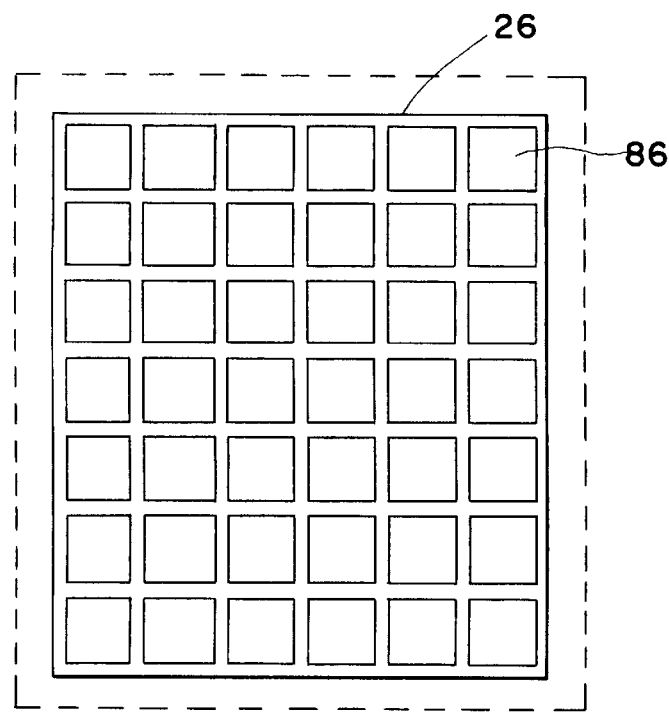
FIG. 5 is a view of the layout of 6×7 array (ACM) of FIGS. 1 and 2.

The 6×7 switch matrix 26, shown in FIGS. 1, 2 and 5, is used in dual modes, the display selection module (DSM) and the ACM. In order to change mode in a training environment, a quick release module is required. The 6×7 matrix 26 comprises backlit illuminated switches 86. Each switch 86 has a fixed legend and through control of the lamps providing the illumination indicates the switch state. FIG. 5 shows the layout of the 6×7 array 26. Each switch 86 is divided into two sections with each section having an individual lamp. Software tools (not shown) to control panel lamps are included.

Switches 86 labeled 0 to 9 cause the respective digit to appear in the digital display entry unit (DDEU) display area located at the bottom of the BDU monitors 14. Previous digits are shifted to the left. The switch 86 labeled CLR causes all 0s to appear in the DDEU display on the BDU 12. The switch 86 labeled upper CRT/lower CRT will cause the respective CRT to be available for trackball operation and DDEU entry.

Figure 6:
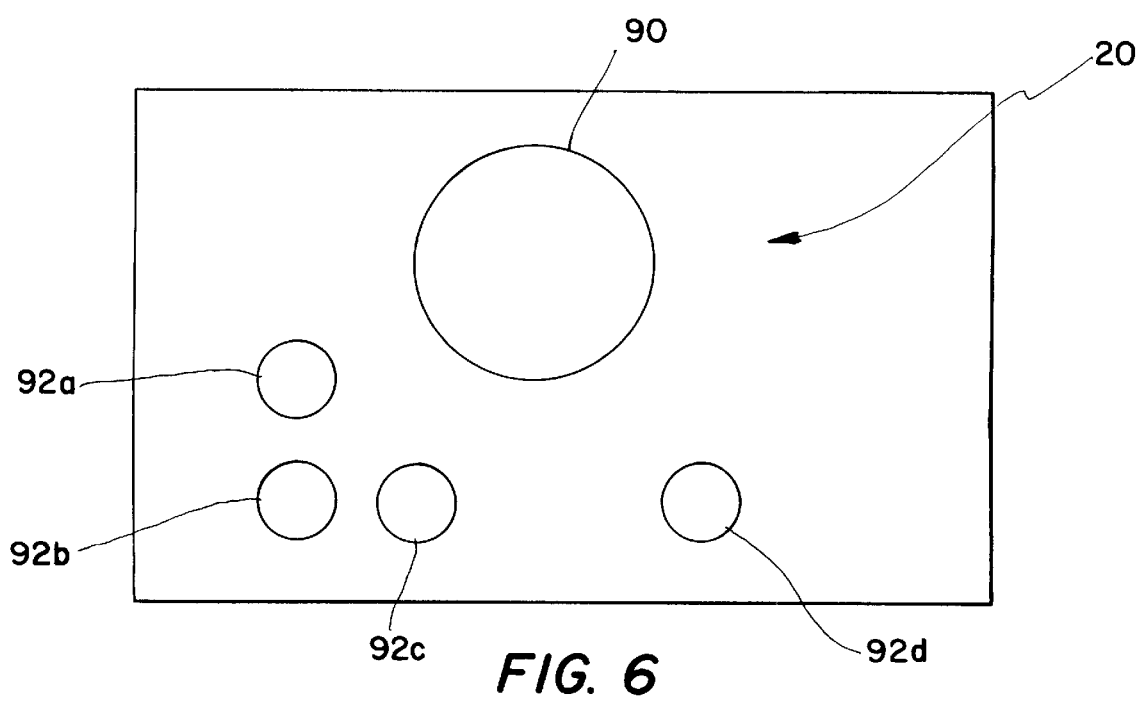
FIG. 6 is a view of the trackball with four special function pushbuttons of FIGS. 1 and 2.

Refer now to FIGS. 1, 2 and 6 for a description of the trackball assembly 20. The trackball assembly 20 comprises a 2½ trackball 90 and the four ball tab switches 92a–d. The display characteristics of the ball tab symbol are under software control. Moving the trackball 90 causes the ball tab symbol to move in the direction the operator has indicated. The trackball spherical rotation encoder designates the X-Y coordinates of any point on the monitor 14 by means of the ball tab symbol.

The four trackball switches 92a–d are all momentary pushbutton switches. The first of these is the sequence switch 92a that causes the program to sequence through tracks under close control, one at a time, allowing the operator to rapidly display and modify track data. The second of these is the ball tab enable switch 92b that enables ball tab display with the ball tab symbol coordinates unaffected. The third is the hook switch 92c, that notifies the program to place track, designated by the ball track symbol, under close control. The fourth ball tab center switch 92d enables ball tab display with ball tab symbol coordinates at the display center.

Refer now to FIGS. 1 and 2. The headset 29 through the headset jack 28 provides the operator audio output from the console digital audio encoder/decoder 48 as well as audio output from the laser disc player 54. The headset jack 28 is located under the console cabinet bullnose 19 with easy access to connect/disconnect the operator headsets 29 from the console cabinet 11. The headsets 29 are selectable from either mono or stereo with an audible signal available to both ears of the operator.

There has therefore been described an interactive video delivery system training aid comprised of a console connected to a desktop computer, a videodisc system 54, and associated peripherals. The training aid emulates the tactical displays and provides expert instruction at the same time. Therefore, an operator can sit at a console; get expert instruction including any relevant video, audio, graphics, etc. from the "best" instructors; get hands-on experience with knobs and switches to develop psychomotor skills; get individualized remediation for mistakes; get standardized testing; and progress through the course at his own pace.

Learning is enhanced because the student is taught a topic or knowledge element and immediately is provided the opportunity to apply that knowledge. This contrasts with the present system of teaching several topics in the classroom and then waiting to cycle through the lab in order to apply the knowledge and practice skills. This division of information into small segments and immediately applying that information on equipment that acts like the actual tactical system enhances student retention.

Laboratory time on an actual tactical system is not replaced by the IVDS training aid. However, time on the tactical system is more productive because the student has already learned the procedures on the IVDS system. The unstructured time is significantly reduced because students are working individually on the IVDS system while waiting their turn on the tactical system.

Cost is significantly reduced over emulation because the IVDS training aid does not provide full emulation of sensors. The IVDS restricts active functions to the particular functions necessary to instruct the current topic. Other functions are inactive. All functions may be active at different times throughout a course; however, a limited number are available at any particular time. The IVDS concept uses canned scenarios with a limited freeplay capability. Since active functions are limited in number it is possible to eliminate full sensor and processing emulation and their associated costs.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A training aid for display systems comprising:

an integrated processor/video disc system having means for interacting with suitable software for performing the functions of system control, I/O control, data transfer, videodisc control, screen display generation and update, and student performance monitoring;

a computer controlled action entry panel comprising switches connected to said integrated processor/video disc system, said computer controlled action entry panel having means for selecting, receiving and displaying information from said integrated processor/video disc system;

at least one basic display unit assembly connected to said integrated processor/video disc system, each of said at least one basic unit assembly comprising a video monitor, touchscreen, and switches, said at least one basic unit assembly having means for selecting, receiving and displaying information from said integrated processor/video disc system;

a trackball assembly having means for controlling the movement of a ball tab symbol on said video monitor; and a switch array connected to said integrated processor/video disc system, said at least one basic display unit assembly, and said trackball assembly, said switch array for providing switching means between said components to which it is connected.

2. A training aid for display systems according to claim 1 wherein said integrated processor/video disc system further comprises:

a computer with a keyboard, said computer further comprises a host processor, a hard disk controller card, at least one graphics board, a video graphics card, an audio encoder/decoder, a networking card, and an MDA card; and a laser disk player for supplying an audio output to said audio encoder/decoder and a video output to said video graphics card.

3. A training aid for display systems according to claim 2 wherein said computer controlled action entry panel further comprises:

a cathode ray tube device for displaying legends under software control;

variable action buttons that are dynamic function switches under software control;

fixed action buttons; and a feedback indicator lamp for acknowledgement of variable action button depression.

4. A training aid for display systems according to claim 3 wherein each of said at least one basic display unit assembly further comprises:

said video monitor being a high resolution color monitor;

said touchscreen being an SAW touchscreen;

said switches being variable function keys; and a feedback indicator lamp for acknowledgement of variable function key depression.

5. A training aid for display systems according to claim 4 wherein said trackball assembly further comprises a trackball and a plurality of ball tab switches.

* * * * *